H. Shaw,
Horse Power,
No. 81,544.    Patented Aug 25, 1868.

Witnesses
Rufus R Rivers
J. Hurdfall

Inventor
Henry Shaw

United States Patent Office.

HENRY SHAW, OF NEW ORLEANS, LOUISIANA.

Letters Patent No. 81,544, dated August 25, 1868.

IMPROVED MODE OF CONNECTING THE DRAUGHT-LEVER TO HORSE-POWER MACHINES.

*The Schedule referred to in these Letters Patent and making part of the same.*

TO ALL WHOM IT MAY CONCERN:

Be it known that I, HENRY SHAW, of the city of New Orleans, parish of Orleans, and State of Louisiana, have invented a certain new, useful, and improved Mode of Connecting the Draught or Actuating-Levers of Horse-Power Machines to the Driving-Wheels thereof; and I do hereby declare the following to be a full, clear, and exact description of the same, reference being had to the annexed drawing, making a part of this specification, in which—

Figure 1:
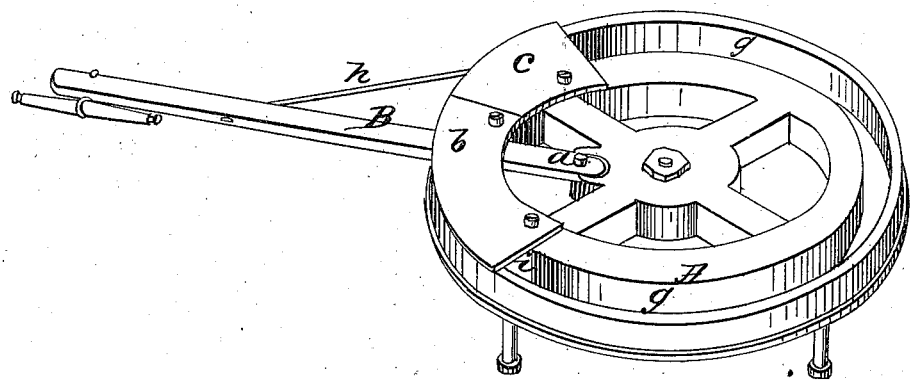
Figure 2:
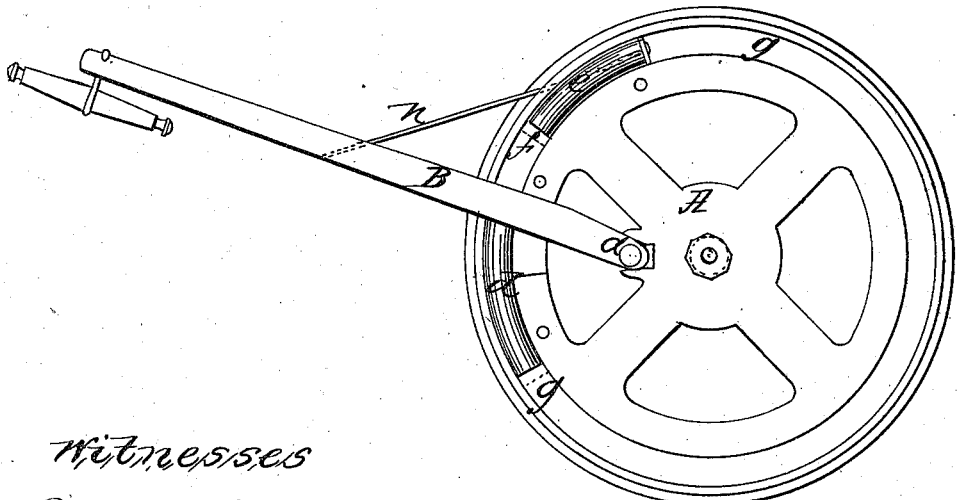

Figure 1 is a perspective view of the driving-wheel of a horse-power with one actuating-lever attached thereto by my method, with the springs that are used in connection therewith hidden by a covering-cap, and Figure 2 a top view of a similar wheel with a lever attached, but with the covering-caps removed, in order to exhibit the said springs and their relation to the lever.

It is well known to all who are called upon to deal with horse-power machines, that in consequence of the fixed or unyielding nature of existing methods of applying the actuating or draught-levers to those machines, the animals that work them, as well as the machines themselves, are subjected to continually-recurring shocks that to a greater or less extent injure both. The severest shock resulting from this cause probably occurs at the time of starting the machine, but there is a continual liability to sudden jars during the operation of the machine, from irregularity in feeding it, and other causes that need not be herein specified, every one of which tells injuriously upon the animals and the machine. Moreover, it often happens that when more than one team of animals is employed to work the machine, the levers are violently jerked first by one and then by another of said teams, in consequence of the difficulty of starting them simultaneously, and of the rigidity of the levers, and that hence a number of shocks occur, instead of one, at each starting of the machine.

By the introduction or substitution of a yielding and vibratory lever in lieu of the ordinary fixed one, I remedy all these evils; that is to say, I relieve the animals and the machine of all liability of jar or shock to any considerable or notable degree, and hence, no matter what the number of teams employed, practically overcome the consequences of their not starting together, by relieving those that start first sufficiently to induce them to continue their pull until the others start, and the combined effort of all puts the machine in operation.

To make the levers yielding and vibratory, I pivot them to the driving-wheel of the machine, not very far from the axis of the same, and apply two springs, one upon each side of them, near the perimeter of the said wheel. My invention, therefore, consists of the combination of two reverse springs with a pivoted or articulating lever for operating horse-power machines, but it will more quickly and clearly be understood by referring to the drawing.

A is the driving-wheel of a horse-power machine, and B the actuating-lever for operating the same. These two parts may be applied or used in connection with any kind of machine, without regard to the particular purpose or work for which it is designed or intended to perform, and hence I have not deemed it necessary to exhibit on the drawing any machine whatever, nor any part beyond those which constitute my invention, or are directly associated therewith and necessary to their operation.

The lever B is pivoted at its inner extremity, by means of a pin, *a*, to the driving-wheel A, and, passing through an elongated slot in the perimeter of the said wheel, has a lateral vibration that is coextensive with the length of the arc of the perimeter occupied by said slot in the line of the arc of the perimeter. Of course at its outer extremity the swing of the lever is proportionately greater, accordingly as the length of the lever is extended. One-sixth of the circumference of the driving-wheel would always cover a sufficient space for the vibration of the levers at that point to prevent jarring either to the animals or the machine. In most cases a shorter vibration would be enough.

The slot is made by cutting a recess in the rim of the driving-wheel, and then covering the same with the cap-plates *b*, which, with the plate *c*, subserve the additional purpose of covering up and holding in position the springs *d e*.

These springs are placed in an annular groove, $g$, and may be maintained in their places by pendent stoppers from the covering cap-plates or transverse edges across the groove $g$. The drawing shows stoppers on the covering cap-plates, the one on $b$ being shown at $i$, the one on $c$ being hidden by the close contact of that plate with $b$, but its position is at $f$ on fig. 2. The spring $d$ comes or is so placed as to be in direct contact with the lever on that side of it towards which it moves when power is applied to it to start the machine, and hence the tensile force of this spring is exerted in the opposite direction. This force of the spring $e$ is also exerted in the same direction, and even more effectively through the agency of the rod-brace $h$, which brings it into communication with the lever B at a point considerably outside the perimeter of the driving-wheel, as shown. This rod $h$ connects with the further end of the spring $e$, and hence, in the vibration of the lever B by the pull of the animals or other power, by man, for example, the compression of the spring develops the force to bring the lever back to its normal position whenever the strain is taken off by the starting of the machine, whilst at the same time it is the source or cause of the yielding of the same, which yielding constitutes the great point of merit in my invention.

The springs $d$ and $e$ may be of any character or description that will admit of their easy application to the object I have in view. So also the driving-wheel may be of any form and construction that will allow of the use of the springs in connection with a pivoted lever.

The face-plates or caps $b$ $c$ may be extended all around the wheel, and be continuous, instead of being in sections or parts, as shown, or they may be entirely dispensed with, and the springs be kept in place by any other equivalent arrangement.

My invention may be used in connection with any machine that can be operated by man or the lower animals, whatever may be the purpose it is designed to accomplish.

Having thus described my invention, what I claim, and desire to secure by Letters Patent, is—

The springs $d$ $e$, in combination with the lever B, when the latter is pivoted to the driving-wheel A, and the several parts are arranged, constructed, and conjointly operated, substantially as herein described, for the purpose set forth.

HENRY SHAW.

Witnesses:
RUFUS R. RHODES,
F. H. WIGFALL.